Figure 1:
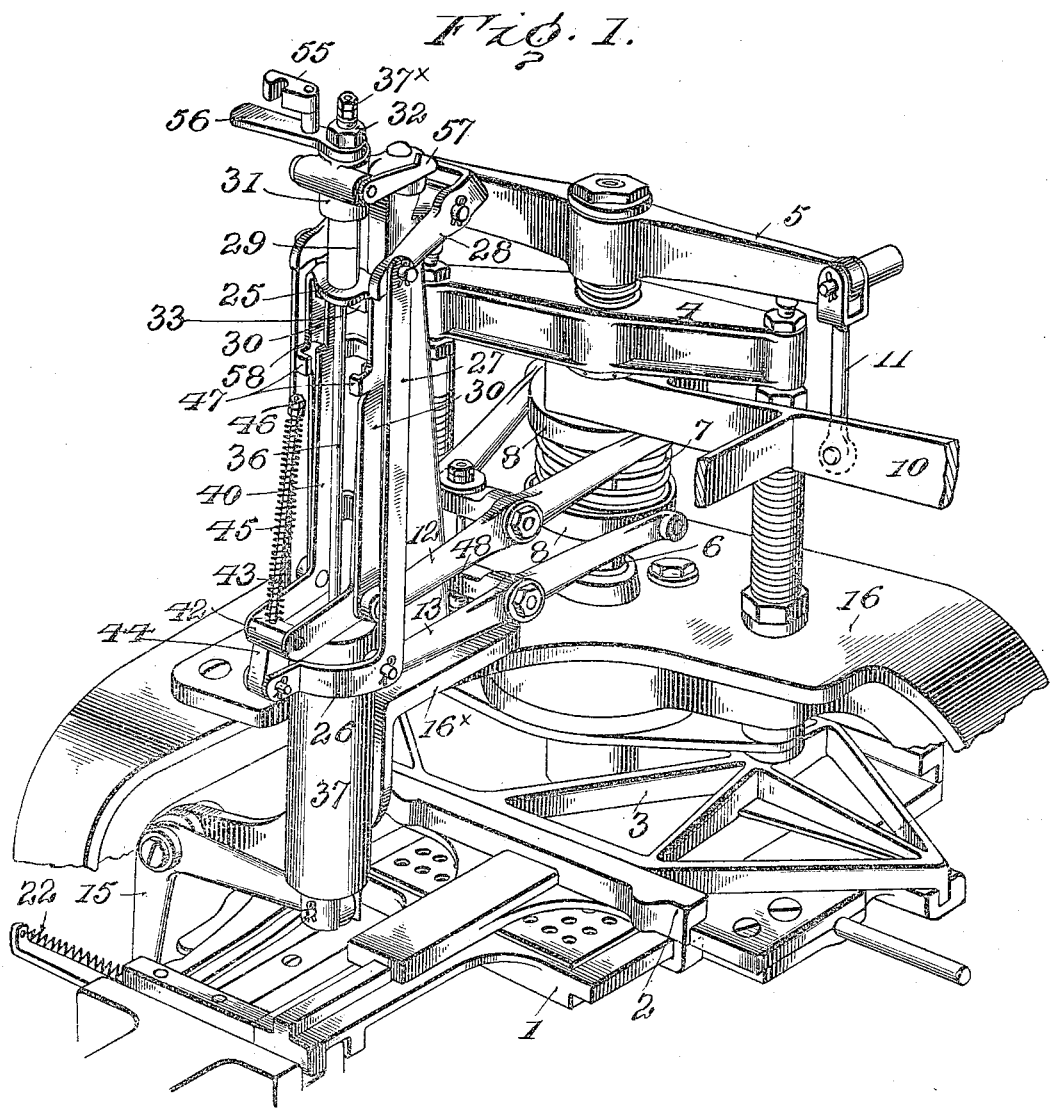

J. S. BANCROFT & M. C. INDAHL.
CONTROL MECHANISM FOR LOW QUAD MOLDS.
APPLICATION FILED JULY 8, 1909.

962,412.

Patented June 28, 1910.

7 SHEETS—SHEET 1.

J. S. BANCROFT & M. C. INDAHL.
CONTROL MECHANISM FOR LOW QUAD MOLDS.
APPLICATION FILED JULY 8, 1909.

962,412.

Patented June 28, 1910.
7 SHEETS—SHEET 2.

J. S. BANCROFT & M. C. INDAHL.
CONTROL MECHANISM FOR LOW QUAD MOLDS.
APPLICATION FILED JULY 8, 1909.

962,412.

Patented June 28, 1910.

7 SHEETS—SHEET 3.

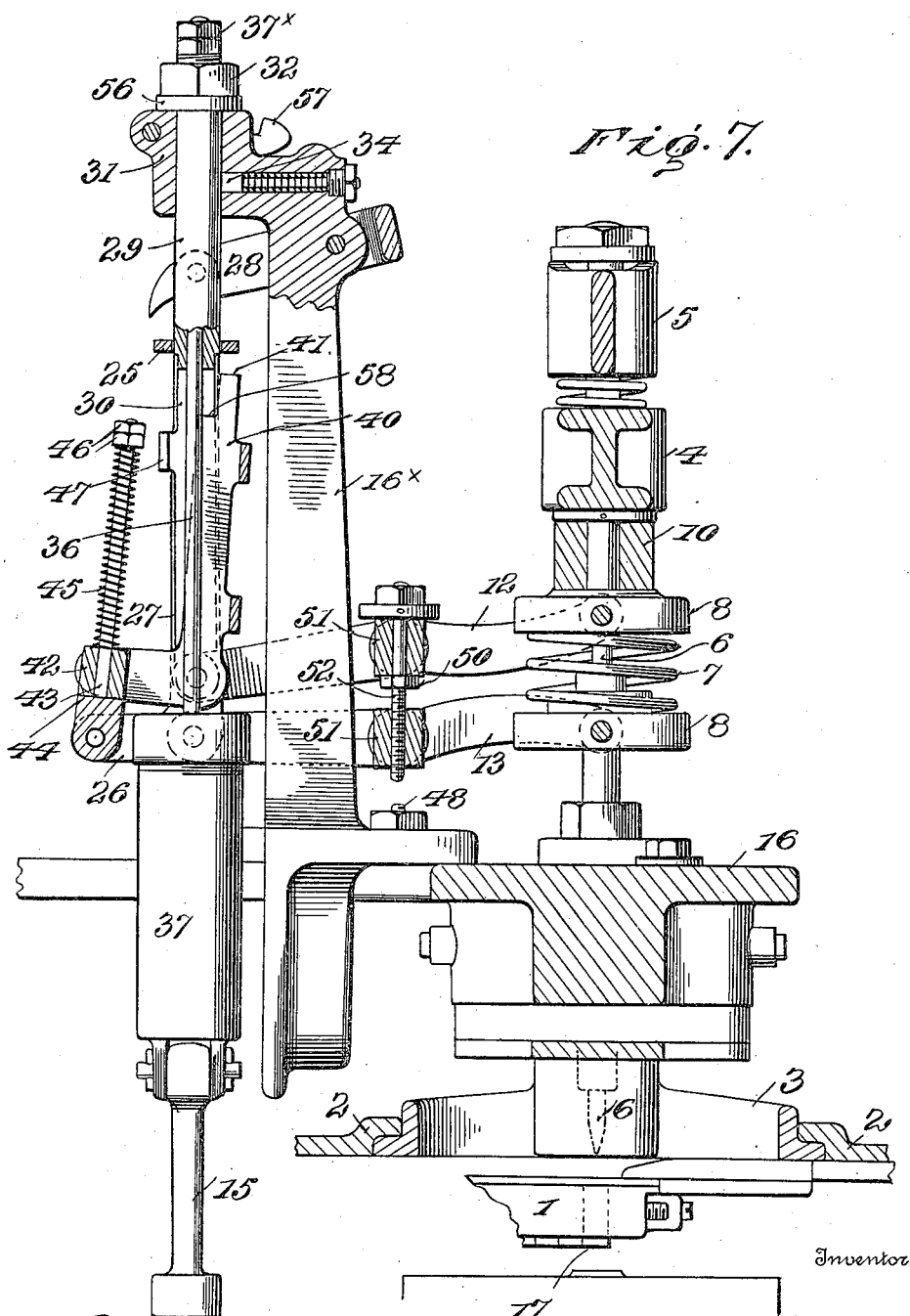

J. S. BANCROFT & M. C. INDAHL.
CONTROL MECHANISM FOR LOW QUAD MOLDS.
APPLICATION FILED JULY 8, 1909.

962,412.

Patented June 28, 1910
7 SHEETS—SHEET 5.

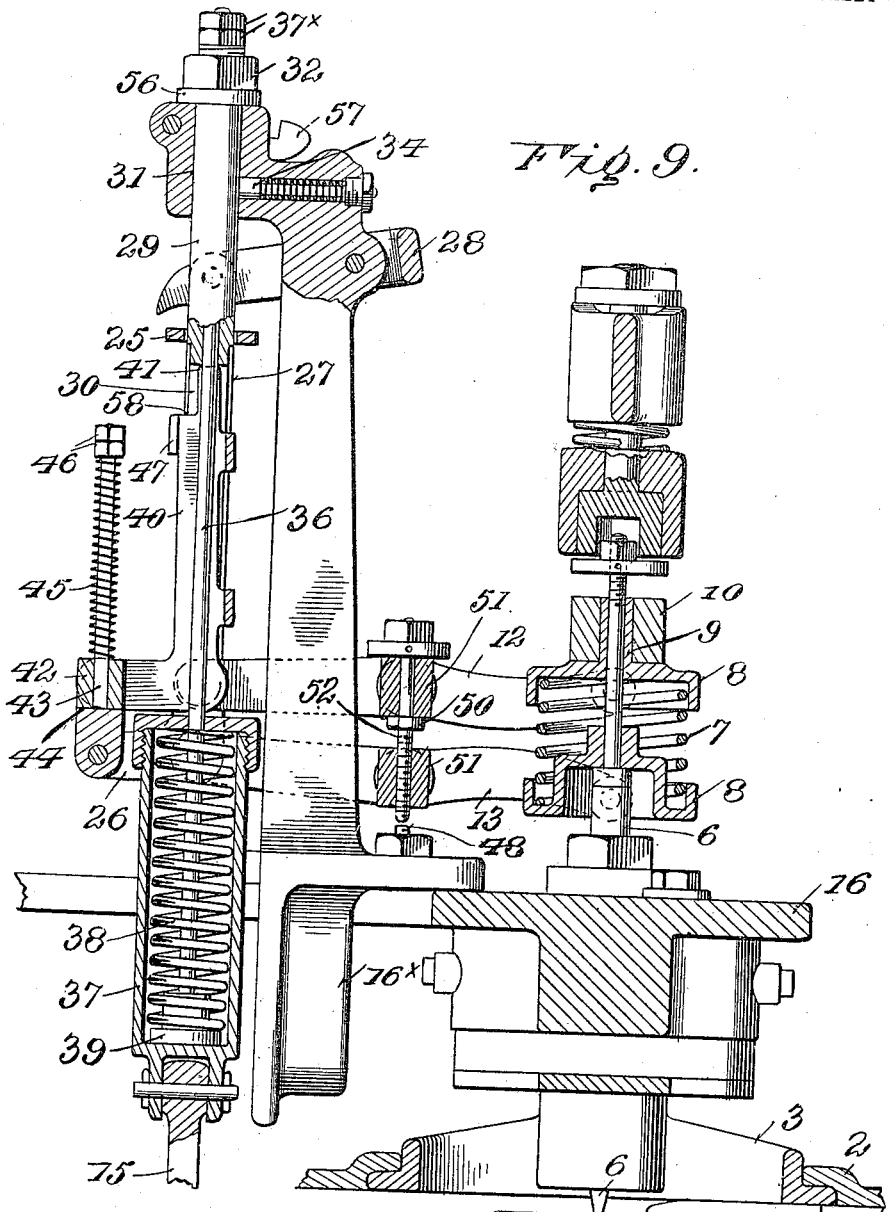

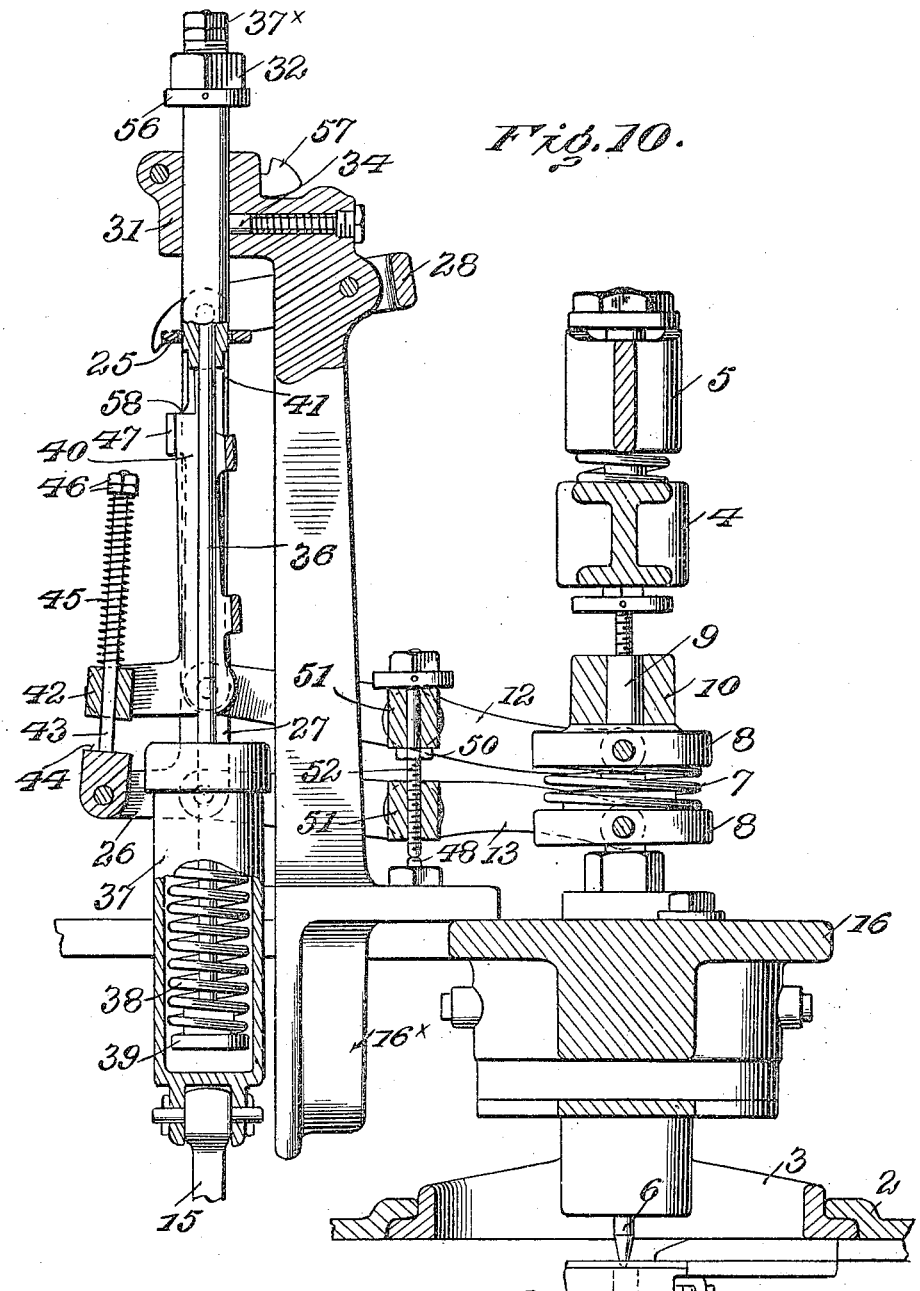

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

CONTROL MECHANISM FOR LOW-QUAD MOLDS.

962,412.

Specification of Letters Patent.

Patented June 28, 1910.

Application filed July 8, 1909. Serial No. 506,550.

*To all whom it may concern:*

Be it known that we, JOHN SELLERS BANCROFT and MAURITZ C. INDAHL, citizens of the United States, residing at Philadelphia, county of Philadelphia, and State of Pennsylvania, have invented certain new and useful Improvements in Control Mechanism for Low-Quad Molds; and we do hereby declare the following to be a full, clear, and exact description of the same, reference being had to the accompanying drawings, forming a part of this specification, and to the figures of reference marked thereon.

The present invention relates to and constitutes an improvement upon the mold operating mechanism of Patent No. 828,450, dated August 14, 1906, and has for its object to prevent rupture and deformation of the matrices and centering pin during the seating of the former upon the mold and, incidentally, to improve the construction of the transmitting devices.

The mechanism of the aforesaid patent is so organized that the cut-off actuating devices exert pressure upon the centering pin concurrently with the compression spring thereby materially increasing the load on the centering pin over and above the amount required to retain the matrix firmly upon its seat. This is due to the fact that when the upper member of the floating tongs is tilted, to actuate the cut-off section of the mold, a part of the pressure upon its fulcrum is transmitted through the lower member to the centering pin, thereby supplementing the action of the compression spring which has already been put under increased tension by reason of the fact that it has been arrested by the quad matrix at an earlier point in its movement than when engaging a character or full body type matrix. The effect of thus overloading the centering pin is to cause it to enlarge its seat on the matrix and otherwise distort or deform the latter or the point of the centering pin.

According to the present invention, means, other than the centering pin, are provided for sustaining the pressure upon the fulcrum of the cut-off actuating member of the floating tongs, to relieve the centering pin from excess pressure, and, in addition, minor improvements are incorporated in the actuating devices for the cut-off, all as hereinafter will more fully and at large appear from the accompanying description and claims.

Figure 2:
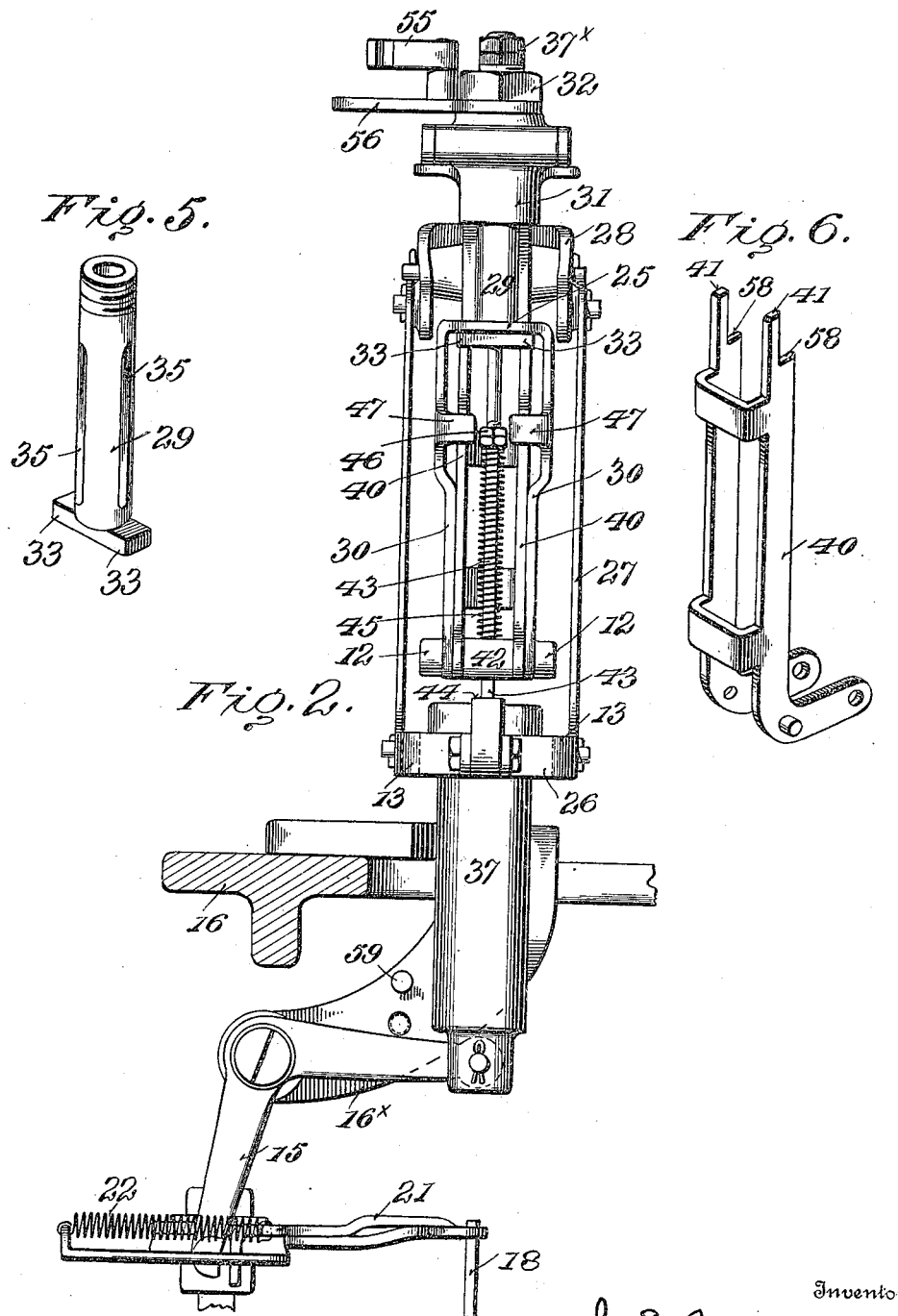
Figure 3:
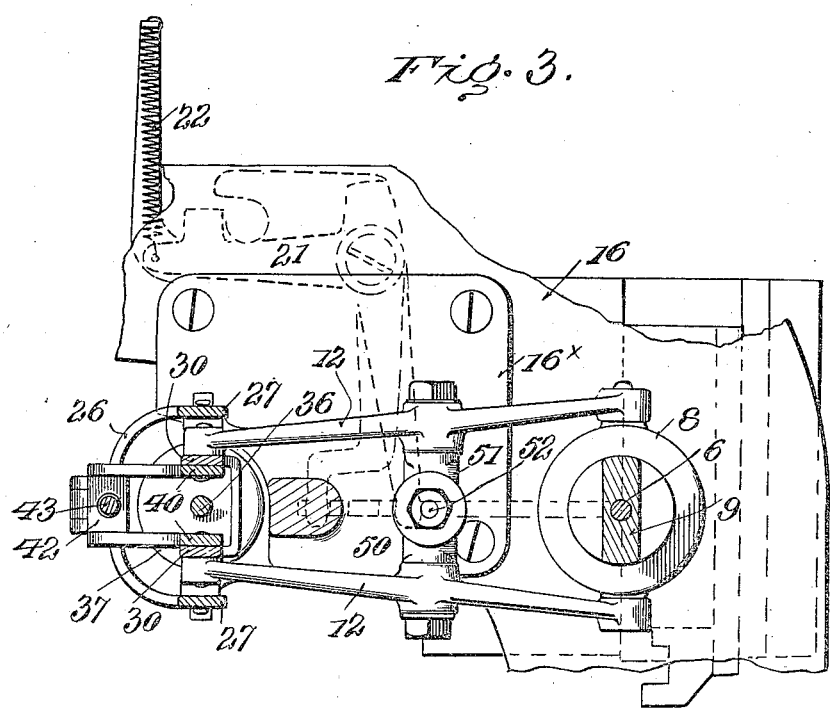
Figure 4:
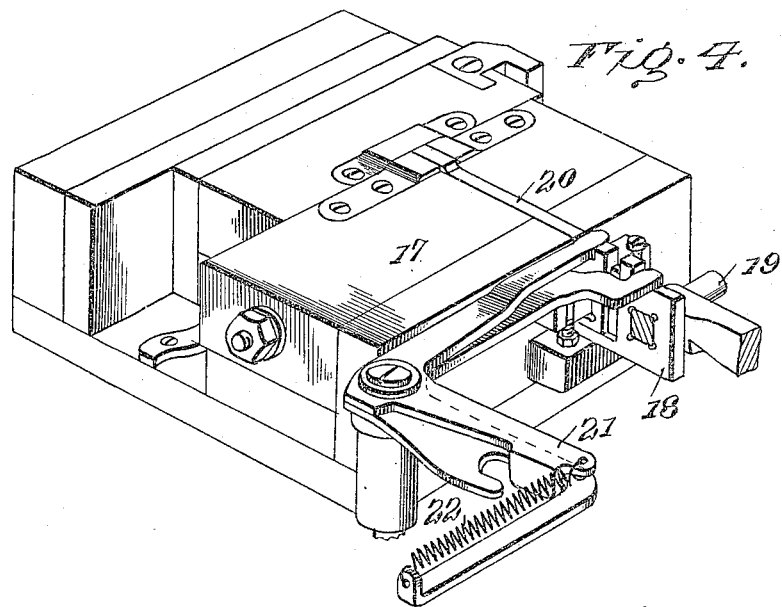
Figure 8:
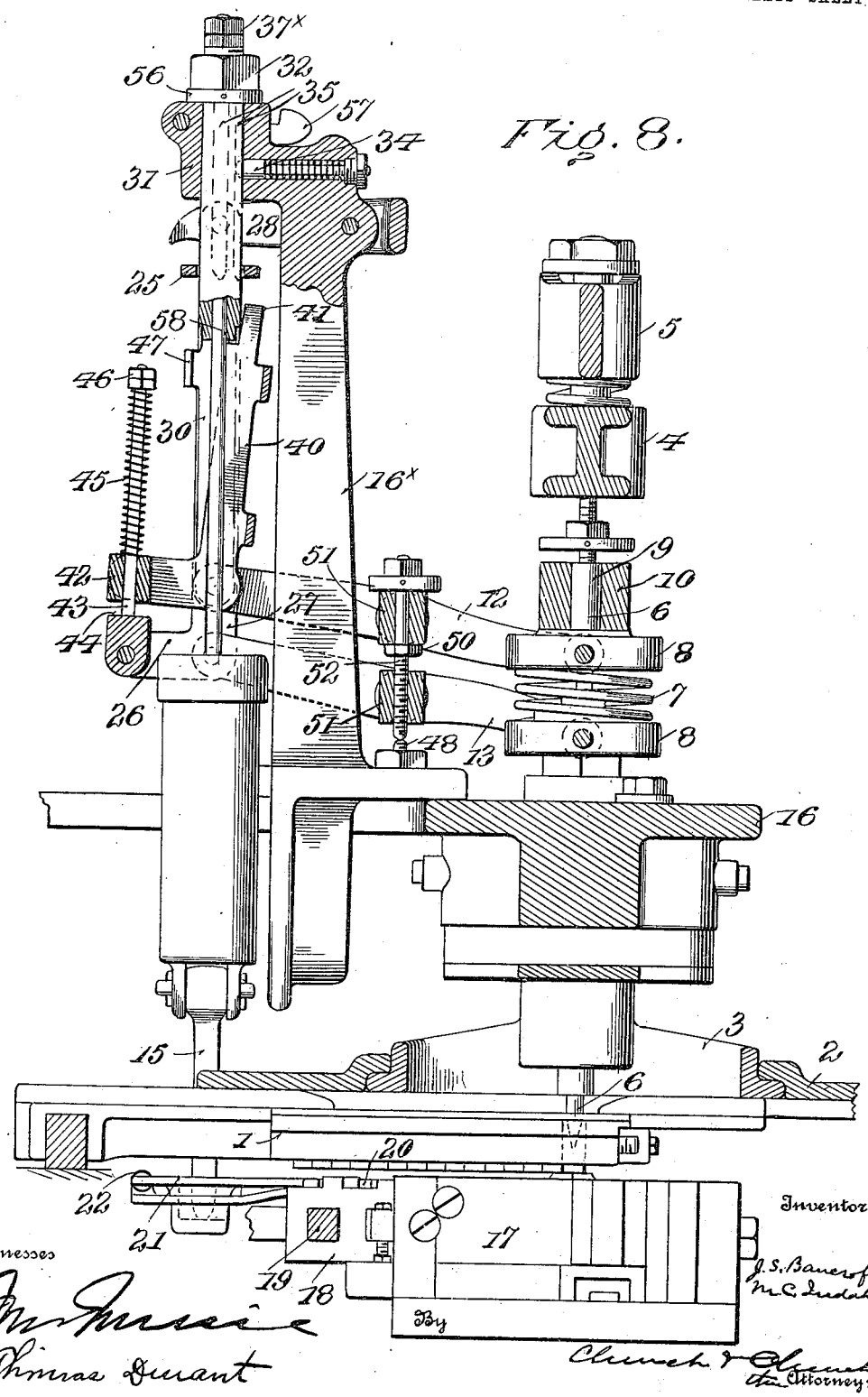

In the accompanying drawings illustrating a preferred form of embodiment of the said invention—Figure 1 is a perspective view of a portion of the type casting machine, including the control mechanism for the cut-off section of the mold blade. Fig. 2 is a front elevation of the control attachment. Fig. 3 is a horizontal section. Fig. 4 is a perspective view of one form of low quad mold to which the improvements are applicable. Fig. 5 is a perspective view of the shiftable abutment. Fig. 6 is a perspective view of the movable interponent. Fig. 7 is a vertical sectional view of the attachment with centering pin and die case support in their extreme elevated or retracted position. Fig. 8 is a similar view but with the centering pin and die case in their extreme forward position, the former engaging a character matrix. Fig. 9 is a similar view illustrating the effect of the engagement of the centering pin with a quad matrix during the advance of the die case and before the latter reaches its seat on the mold. Fig. 10 is a similar view showing the relation of the parts when the die case reaches its seat on the mold.

Similar numerals designate like parts in the several figures.

The machine illustrated contains a number of elements exhibited in the prior patent including the following; the two-way movable die case 1, with its carrier 2, supporting frame 3, crosshead 4, and lever 5; the centering pin or driven member 6, with compression spring 7 interposed between collars 8, the one engaging a shoulder on the centering pin and the other a head or driving member 9 movable on said pin; the main actuating lever 10 engaging head 9 and coupled with die case lever 5 through link 11; the floating tongs composed of pivotally connected upper and lower members 12, 13 with the inner end of the upper member 12 coupled with the collar 8 located between compression spring 7 and head 9, and the corresponding end of lower member 13 coupled with the collar 8 located between the compression spring and centering pin 6; transmitting lever 15; bridge or frame 16 supporting the die case and centering pin mechanism; detachable frame 16× for the mold actuating devices; and low quad mold 17 provided with a sectional or divided mold blade whereof the main section 18 is connected by crosspin 19 with the mold dimensioning devices.

The mold shown, while generically the same as that of the prior patent, contains improvements forming the subject of a separate application, Serial No. 499,950 filed June 3, 1909, and its substitution in this case is merely for the purpose of illustrating that the control mechanism is applicable to different styles and types of low quad molds. Thus, in the prior patent, transmitting lever 15 was connected with the cut-off section 20 through an intermediate lever acting upon the latch which served to couple the two sections together with their casting faces in alinement, whereas, in the present instance, said lever 15 is arranged to swing in a path intersecting the power end of and thus directly engage the floating lever 21 coupled with the cut-off section 20, for projecting the latter into the mold cavity, beyond the main section, against the pressure of a retracting spring 22.

The improvements relate particularly to the floating tongs and the means for communicating motion therefrom to the transmitting member 15, and, as a preliminary to a description of the same, it should be noted that the movement of cut-off section 20, to close the mold, is indicated and produced by the presentation to the centering pin of a quad matrix having a relatively shallow or no centering cavity, whereby the motion of the centering pin is arrested at an earlier period than when a high quad or character matrix is interposed, in consequence of which the inner ends of members 12, 13 of the floating tongs are caused to approach and the outer ends to separate, and, further, that the movement communicated by actuating lever 10 to the centering pin, although performed in the same time, differs in extent from that communicated to the die case, to the end that the centering pin when elevated may clear the die case, and when depressed may overtake and engage the matrix preliminary to the seating of the latter upon the mold.

The outer end of each member 12, 13 of the floating tongs is pivotally connected to one of two frames 25, 26. In the example illustrated, the frame 26 to which member 13 is pivoted is formed or provided with vertical extensions 27 pivotally connected to the arms of a yoke 28, the latter pivoted to frame 16× and constituting the guiding member for said frame; while frame 25 comprises a crosshead suitably guided, as upon transmission member 29, and provided with dependent arms 30 for receiving member 12.

Transmission member 29, supported for longitudinal movement in a bearing 31 on frame 16×, is provided with an adjustable head or nut 32 above said bearing, with one or more, preferably two, offsets or shoulders 33 below the crosshead of frame 25, and with means for sustaining it in either of two positions against rotation in its bearing, said last named means being represented by a locking pin 34 adapted to engage either of two longitudinal ways 35 on member 29, whereby the angular position of shoulders 33 may be varied and controlled. The transmitting lever 15 is coupled with said transmission member 29 through the medium of a rod 36 and a spring box or compression member 37. In the preferred form shown, this rod 36 is passed through member 29 and provided with adjusting means, such as nuts 37× for engaging the upper end of said member, while the spring box or compression member is in the form of a casing pivotally connected with transmitting lever 15 and containing a spring 38 interposed between the end of said casing remote from lever 15 and a head 39 on rod 36.

It is obvious that the mechanism thus far described, while affording support for the outer ends of the floating tongs member is incompetent to transmit motion from said tongs to the transmitting lever 15, inasmuch as no working connection is established between said lever and the upper member 12 coupled with the driving member of the centering pin mechanism. Such a connection may, however, be supplied by a movable transmitting member interposed between tongs member 12 and a member of the transmitting devices, such as the tubular member 29 coupled with rod 36. In the present instance, this transmitting member is applied in the form of an interponent 40 (Fig. 6) pivotally connected to frame 25 and provided with a shoulder or shoulders 41 in position to enter beneath and engage the shoulder or shoulders 33 of the tubular member 29.

Pivotally connected with frame 26 to one side of the latter's point of attachment to tongs member 13 and passing through a bearing 42 on interponent 40 to one side of the pivot of the latter is a rod 43 provided with a shoulder 44 beneath bearing 42 and carrying a spring 45 interposed between said bearing and adjusting nuts 46 on the outer end of said rod. The parts are so proportioned, arranged and adjusted that when the centering pin is fully retracted, as in Fig. 7, interponent 40 will stand with its shoulders 41 to one side of and out of register with the shoulders 33 on transmitting member 29, being so held by spring 45 pressing the interponent into contact with shoulder 44, the latter forming a stop for limiting the movement of the interponent in one direction.

So long as the members of the floating tongs move together the position of the interponent will remain unchanged, but immediately the outer ends of the tongs members begin to separate (see Fig. 9) as when the centering pin is arrested before actuating lever 10 completes its movement, the elevation of the pivot of interponent 40 relatively to shoulder 44 will cause the interponent to tilt until arrested by a shoulder 47 on frame 25, thus bringing its engaging shoulders 41 into registry with shoulders 33, whereupon the further movement of member 12 will be transmitted through member 29, rod 36 and compression member 37, to transmitting lever 15. But here, as in the prior device, the downward pressure exerted by the fulcrum of tongs member 12 on tongs member 13 would be transmitted to the centering pin. To remedy this an adjustable bearing 48 is located on frame 16ˣ opposite the fulcrum of member 12 in position to be engaged by the floating tongs during the descent of the centering pin. Conveniently, contact is made with bearing 48 through an extension of the link 50 connecting members 12 and 13, said link comprising two crossheads 51 each pivotally attached to one of the members 12, 13 and a connecting screw 52, the threaded portion whereof engages member 13 and projects beyond the latter in position to engage bearing 48 at or near the limit of the downward movement of member 13.

Bearing 48 is adjusted to engage the floating tongs immediately after the centering pin has overtaken and engaged a low quad matrix when presented thereto, (Fig. 9) this being the critical point for determining whether or not motion shall be given to lever 15. It is to be borne in mind that the low quad matrix is provided with a shallow centering cavity, or none at all, hence, is engaged by the centering pin at an earlier stage in its movement toward the mold than is the high quad or character matrix with its relatively deep centering cavity.

Briefly stated, the operation of the mechanism is as follows: When a low quad matrix is presented, that is, a matrix with a relatively shallow centering cavity or none at all, it is overtaken and engaged by the centering pin before the die case has reached the limit of its motion and is still advancing toward the mold, in consequence whereof pressure is exerted upon upper member 12 of the tongs to tilt the latter, and, by displacing the pivot of interponent 40 relatively to shoulder 44, to shift said interponent into register with transmitting member 29, as indicated in Fig. 9. Immediately thereafter the floating tongs engage bearing 48 and said tongs cease to float, each member 12, 13 thereafter operating independently as a lever fulcrumed upon the connecting link. The two members now move in the same direction, but at different speeds (the upper member 12 moving the faster) until the lower member 13 is brought to rest by the die case arriving at the limit of its motion. During this last named movement and before the matrix is seated under pressure upon the mold, the movement of member 12 on its now stationary fulcrum elevates transmission member 29, places spring 37 under compression and shifts the cut-off section of the mold (Fig. 10). If, however, the matrix presented to the centering pin represents a full body type, hence is provided with a shorter bearing or deeper cone hole for the reception of the centering pin, the latter will not engage its bearing upon the matrix, so as to be retarded thereby until after the floating tongs have engaged bearing 48, and the tilting of both members 12, 13 incident to such engagement will carry the interponent 40 past the engaging shoulder on transmission member 29, as shown in Fig. 8, so that when the differential motion is subsequently communicated to members 12, 13 it is no longer capable of moving the interponent to active position, hence, no motion will be communicated thereby to the transmission devices for lever 15. When, for any reason, it is desired to prevent the floating tongs from acting upon the cut-off section, it is only necessary to withdraw locking pin 34 and rotate transmission member 29 in its bearing to withdraw its shoulders 33 from the path of interponent 40 where it may be retained by the reëngagement of the locking pin with one of the ways 35. This leaves the interponent free to reciprocate alongside member 29 without communicating motion to the latter.

As hereinbefore intimated, the control mechanism described is adapted for use in connection with various forms of low quad molds. Certain of said molds require that the initial position of the arms of lever 15 be varied, as by advancing the engaging arms or member so that it will stand nearer the transmission member to be operated upon. This may be accomplished either by the adjusting nuts 37 on rod 36, or more quickly by the interposition of a gage block 55 between said nuts and transmission member 29, said block being preferably pivotally supported upon a plate 56 carried by member 29. The improved mechanism is also adapted, like its predecessor, to reinforce or augment the pressure upon the centering pin when the casting machine is equipped to produce larger type. With this end in view latches 57 are provided for engaging the ends of yoke 28, interponent 40 is provided with shoulders 58 in position to engage transmitting member 29, and a stop is applied to prevent the elevation of the member of the spring box, coupled with lever 15, as by the insertion of a removable pin 59 (Fig. 2) in hole in the frame, said pin projecting into the path traversed by lever 15 and preventing upward motion of the horizontal arm thereof to which the spring box is attached. The parts being in the normal position illustrated in Fig. 7, if frame 26 is elevated until yoke 28 is engaged by latches 57, the pivot end of the tongs will be elevated and thus prevent engagement with bearing 48 and at the same time shoulders 58 of interponent 40 will contact or nearly so with the head of transmission member 29, the latter retaining its initial position. If, now, the centering pin is advanced under the action of compression 7, the continued motion of head 9 after lower member 13 had been arrested by the seating of the centering pin will tilt upper member 12 to compress spring 38, and in so doing will exert pressure upon lower member 13 in the same direction as does the compression or seating spring 7. When the attachment is used to control the cut-off section of a low quad mold pin 59 is withdrawn and may be held for subsequent use by being inserted in a hole conveniently located outside the path of lever 15.

Having thus described our invention, what we claim as new and desire to secure by Letters Patent of the United States, is:—

1. In a control mechanism for low quad molds equipped with floating tongs and transmission devices and in combination therewith an interponent adapted to be entered between one of the tongs members and a member of the transmission devices.

2. In a control mechanism for low quad molds, the combination of the following elements, to-wit; driving and driven members coupled through a compression spring; floating tongs the members whereof are pivotally supported at one end and coupled at the other end with said driving and driven members, respectively; a transmitting member; and an interponent adapted to be interposed between said transmitting member and that one of the tongs members coupled with the driving member.

3. In a control mechanism for low quad molds, the combination of the following elements, to-wit; a centering mechanism including a die case, a movable support therefor, a centering pin, and actuating devices adapted to reciprocate the die case support and centering pin at different rates of speed and provided with a yielding connection between the centering pin and its driving member; a mold provided with a cut-off section; floating tongs having one of its members coupled with the centering pin and the other with the driving member; transmission devices intermediate the cut-off section of the mold and that one of the tongs members coupled with the centering pin driving member; and means for intercepting and supporting the floating tongs at an intermediate point in the stroke of the centering pin.

4. A control mechanism for low quad molds including, in combination, the following elements, to-wit; a matrix centering mechanism provided with a centering pin, a driving member therefor and an interposed yielding connection or compression spring; floating tongs the members whereof are coupled at one end to said driving member and centering pin, respectively, and at the opposite end to movable frames or supports; transmission devices intermediate the cut-off section of the mold and the movable frame or support for that one of the tongs members coupled with said driving member; and a bearing in the path traversed by the tongs for arresting the latter and sustaining the pressure on the fulcrums of its members.

5. In type composing machines provided with a low quad mold and matrix centering mechanism, the latter including a centering pin, a driving member therefor and an interposed compression spring, and in combination therewith, a control mechanism for the cut-off section of the mold including a pair of floating tongs the members whereof are connected at one end to said centering pin and driving member, respectively, transmission devices intermediate one member of the tongs and the cut-off section of the mold, and a relatively fixed bearing interposed in the path traversed by the tongs and substantially in line with the pivoted connection between the members comprising said tongs.

6. A type machine provided with a low quad mold and matrix, clamping devices, the latter including a pin, a driving member therefor and an interposed compression spring, and in combination therewith, controlling devices for the cut-off section of the mold, including a pair of floating tongs, the members whereof are pivotally supported at one end and coupled at the opposite end to said driving member and pin, respectively; a bearing located in the path of the floating tongs opposite the pivotal connection between its members; transmission devices for the cut-off section of the mold; an interponent arranged for interposition between one member of said tongs and said transmission devices; and means coupled with the other member of said tongs for automatically actuating said interponent.

7. In a control mechanism for low quad molds, the combination of the following elements, to-wit; a pair of floating tongs the members whereof are pivotally connected at one end to separable supports or frames; a separate actuating device for each member of the said tongs both movable in the same direction but to different extents; a transmission member; an interponent for coupling said transmission member and one of the tongs members; and actuating devices for said interponent responding to a movement of separation on the part of the tongs members.

8. In a control mechanism for low quad molds, the combination of the following elements, to-wit; a pair of floating tongs the members whereof are pivotally connected to separate supports at one end and to separate actuating devices at the opposite end of said tongs; a transmission member; and an interponent carried by the support of one tongs member in position to be engaged with the transmission member.

9. In a control mechanism for low quad molds, the combination of the following elements, to-wit; a pair of floating tongs the members whereof are each connected at one end to one of a pair of separately movable supports or frames, and at the other end to one of a pair of actuating members; a transmission member; an interponent pivoted upon one of said separately movable supports or frames in position to engage said transmission member; means for advancing said interponent into the path of said transmission member; and a stop coupled with the movable frame or support adjacent that carrying said interponent, said stop operating to withhold the interponent from engagement with said transmitting member and to permit such engagement when the stop is retracted.

10. A control mechanism for low quad molds provided with a pair of floating tongs the members whereof are each pivotally supported at one end and coupled at the opposite end to one of two actuating devices movable in the same direction, but at different speeds, and transmission devices coupled with the pivotal end of one of the tongs members, and in combination therewith, a bearing or stop interposed in the path of the floating tongs to arrest the latter and support its members during the final movement of the actuating devices.

11. In a type machine provided with a low quad mold, matrix clamping devices, floating tongs the members whereof are separately coupled with said clamping devices, and transmission devices for the cut-off member of the mold, and in combination therewith a bearing or support located in the path traversed by the floating tongs and engaged by the latter, a pivoted interponent coupled and moving with one member of the tongs in position to engage a member of the transmission devices, a spring operating to advance the interponent to engaging position, and a stop coupled with the other member of the tongs and operating to retain the interponent retracted until withdrawn by the separation of the tongs members.

12. A control mechanism for low quad molds provided with floating tongs and a transmission member for actuating the cut-off section and in combination therewith a bearing interposed in the path of said floating tongs to arrest the latter; an interponent coupled and moving with one member of the tongs and adapted to engage said transmission member; and means coupled and moving with the other member of the tongs for shifting said interponent into engaging position.

13. A control mechanism for low quad molds including the following elements, in combination, to-wit; a pair of floating tongs the members whereof are each pivotally supported at one end and coupled at the opposite end to separate actuating devices or members movable in the same direction at different speeds; a transmission member for the cut-off section of the mold located in proximity to the pivotal end of one of the tongs members; a bearing or stop for intercepting the tongs; an interponent carried by one of the tongs members in position to be interposed between the latter and the adjacent transmission member; means for automatically moving said interponent into engaging position through a separation of the tongs members; and means for effecting a separation of the tongs members at or prior to the engagement of the tongs with said bearing or stop.

14. A control mechanism for low quad molds equipped with floating tongs and transmission devices coupled with one member of said tongs and in combination therewith a bearing or stop interposed in the path of the tongs and engaging the latter to form a pivotal support therefor.

15. A control mechanism for low quad molds provided with floating tongs and a transmission member for actuating the cut-off section and in combination therewith a bearing interposed in the path of said floating tongs to arrest the latter, an interponent coupled and moving with one member of the tongs and adapted to engage said transmission member, and means coupled and moving with the other member of the tongs for shifting said interponent into engaging position.

16. In a control mechanism for low quad molds, the combination of the following elements, to-wit; a low quad mold provided with a cut-off section; a matrix centering mechanism including a movable die case equipped with a plurality of matrices, the rear or bearing surfaces whereof differ in height or elevation; means for clamping a selected matrix upon the mold including an engaging pin or plunger, an actuator and a compression spring, a pair of floating tongs with the power ends of its members connected to said plunger and actuator, respectively; a bearing located in the path of the tongs and engaged by the latter during the descent of the plunger; a transmission member for the cut-off section; an interponent coupled with the fulcrum end of one of the tongs members, and means coupled with the other tongs member and operating upon the interponent to move the latter into engagement with the transmission member.

17. In a control mechanism for low quad molds wherein the actuating member for the cut-off section of the mold is coupled with the matrix seating mechanism through a pair of floating tongs, and in combination therewith the following elements, to-wit; a longitudinally movable transmission member; an interponent coupled with one member of the floating tongs and movable into and out of engagement with a shoulder on said transmission member.

18. In a control mechanism for low quad molds wherein the actuating member for the cut-off section of the mold is coupled with the matrix seating mechanism through a pair of floating tongs, and in combination therewith, an interponent coupled with one member of the tongs, and a reciprocatory transmission member provided with an offset or shoulder for engagement by said interponent, said transmission member being movable to alternately interpose and withdraw its shoulder from the path of the interponent.

19. In a control mechanism for low quad molds wherein the actuating member for the cut-off section is coupled with the matrix seating mechanism through floating tongs and in combination therewith means for arresting and sustaining the tongs and means for varying the relation of the tongs and said arresting means, to suspend the action of the latter.

20. In a control mechanism for low quad molds the combination of the following elements, to-wit; a pair of floating tongs the members whereof are pivotally supported at one end and connected at the opposite ends to separate actuating members; and a bearing located in the path of the tongs to arrest and sustain the pivotal connection between its members.

21. In a control mechanism for low quad molds, the combination of the following elements, to-wit; a pair of floating tongs the members whereof are pivoted together and each pivotally supported at one end and connected at the opposite end to separate actuating members; a stop or bearing located in the path of the tongs to arrest and support the pivotal connection between its members; and means for shifting the pivotal supports at the ends of the tongs members to change their path of movement with relation to said stop or bearing and prevent contact with the latter.

JOHN SELLERS BANCROFT.
MAURITZ C. INDAHL.

Witnesses:
MORTIMER A. JONES,
FRED WEINDEL, Jr.